United States Patent
Fukushi et al.

(10) Patent No.: US 8,260,152 B2
(45) Date of Patent: Sep. 4, 2012

(54) OPTICAL SIGNAL DETECTION METHOD, AND LIGHT RECEIVING APPARATUS USING THE SAME

(75) Inventors: Togo Fukushi, Kawasaki (JP); Tsukasa Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 386 days.

(21) Appl. No.: 12/585,044

(22) Filed: Sep. 1, 2009

(65) Prior Publication Data

US 2009/0324218 A1   Dec. 31, 2009

Related U.S. Application Data

(63) Continuation of application No. PCT/JP2007/000173, filed on Mar. 6, 2007.

(51) Int. Cl.
*H04B 10/06* (2006.01)

(52) U.S. Cl. ........ 398/202; 398/147; 398/158; 398/159; 398/160; 398/162; 398/151; 398/81; 398/208; 398/209; 398/33; 398/38; 398/25; 359/337; 359/334

(58) Field of Classification Search .................. 398/202, 398/208, 209, 212, 213, 214, 25, 26, 27, 398/33, 38, 158, 147, 148, 149, 159, 160, 398/81, 79, 162, 37, 29, 30, 31, 32, 34, 17, 398/24, 28, 135, 136, 137, 151, 154, 155, 398/210; 359/337, 341, 334, 341.41, 341.02
See application file for complete search history.

(56) References Cited

U.S. PATENT DOCUMENTS

| | | | |
|---|---|---|---|
| 6,081,360 | A | 6/2000 | Ishikawa et al. |
| 6,118,576 | A | 9/2000 | Sugiya et al. |
| 6,304,371 | B1 | 10/2001 | Sugiya et al. |
| 2002/0024725 | A1 | 2/2002 | Sugiya et al. |
| 2003/0002112 | A1* | 1/2003 | Hirano et al. ............ 359/161 |
| 2004/0184813 | A1 | 9/2004 | Mikami |

FOREIGN PATENT DOCUMENTS

JP     61-016638     1/1986
(Continued)

OTHER PUBLICATIONS

International Search Report for PCT/JP2007/000173, mailed May 29, 2007.
(Continued)

*Primary Examiner* — Hanh Phan
(74) *Attorney, Agent, or Firm* — Staas & Halsey LLP

(57) ABSTRACT

A signal detection method used in an optical receiver apparatus detects the variation of an optical input level from the presence or absence of a clock signal and appropriately controls a dispersion compensator, thereby enabling the presence or absence of an input signal to be correctly determined. The signal detection method includes: detecting the level of input light of an optical amplifier, storing the level of the detected input light, comparing the level of the stored previous input light with the level of current input light, detecting the level variation of the input light by the comparison to detect the state change of the presence or absence of an optical signal, performing a dispersion compensation on the input light, and extracting a clock from an optical input. When the level variation of the input light is detected, the presence or absence of the optical signal of the input light is determined from the presence or absence of the clock signal. When the clock signal is not extracted, the dispersion amount is swept.

3 Claims, 5 Drawing Sheets

FOREIGN PATENT DOCUMENTS

| | | |
|---|---|---|
| JP | 08-149071 | 6/1996 |
| JP | 09-292594 | 11/1997 |
| JP | 09-326755 | 12/1997 |
| JP | 10-084152 | 3/1998 |
| JP | 11-088261 | 3/1999 |
| JP | 2004-236097 | 8/2004 |

OTHER PUBLICATIONS

Japanese Office Action mailed Jan. 10, 2012 issued in corresponding Japanese Patent Application No. 2009-508681.

* cited by examiner

US 8,260,152 B2

OPTICAL SIGNAL DETECTION METHOD, AND LIGHT RECEIVING APPARATUS USING THE SAME

CROSS-REFERENCE TO RELATED APPLICATIONS

This application is a continuation of international application PCT/JP2007/00173, filed on Mar. 6, 2007.

FIELD

The embodiments discussed are related to an optical signal detection method and a light receiving apparatus using the same.

BACKGROUND

In a backbone optical communication system, a Wavelength Division Multiplexing (WDM) system is employed to increase transmission capacity and transmission speed.

In the above optical transmission system using the WDM system, optical amplification relay apparatuses each having an optical relay function, and optical transmission equipment having an add/drop function of optical signals in addition to the optical relay function are connected in cascade through an optical transmission line fiber.

The above optical transmission equipment includes a light receiving apparatus which receives an optical signal correspondingly to each wavelength of the optical signals transmitted by wavelength multiplexing. Further, in the light receiving apparatus, the presence or absence of the optical signal is detected, which is then reported to the optical transmission equipment on the subsequent stage, as information.

In such the light receiving apparatus, a WDM preamplifier is frequently used on the input side. The transmitted WDM optical signal is amplified by the WDM preamplifier, which is then separated channel-by-channel (wavelength-by-wavelength) in a demultiplexer.

Also, as the WDM preamplifier, an optical fiber amplifier having an optical fiber, in which a rare-earth element, for example, Erbium is doped on a core portion, is used. To such the optical fiber amplifier, a pumping light is supplied, and an input light is amplified by means of stimulated emission.

Further, at the time of the optical amplification, a spontaneous emission (ASE: Amplified Spontaneous Emission) light is output from the optical fiber amplifier, in addition to the amplified input light. By the accumulation of the above ASE light output from the optical fiber amplifier and the spontaneous emission light, generated from a multiplicity of optical fiber amplifiers for use for long distance transmission, a large noise light is produced after the transmission.

On the other hand, as the transmission distance becomes longer, a level input to an amplifier for a single wave after the wavelength separation by the demultiplexer becomes lower. Therefore, when the above single-wave amplifier performs ALC (Automatic Level Control) operation, the level of the output ASE light becomes high because of an increased gain.

As such, when there is no optical signal in the receiving apparatus, it is necessary to report the above state (a light input break) to the transmission equipment on the subsequent stage, and however, if the level of the ASE light is in a state higher than the level of the received signal light, it is not possible to discriminate the presence or absence of the signal only by the light level.

Therefore, in order to discriminate whether the light being input to the light receiving apparatus is an optical signal or an ASE light, it is considered to decide the presence or absence of an extracted clock of the optical signal using a clock extraction function provided in the light receiving apparatus.

However, as a bitrate becomes higher, a dispersion compensator is inserted before the light receiving apparatus, because of the necessity to compensate residual wavelength dispersion by the fiber transmission line.

As conventional techniques, an invention is described in the first patent document of Japanese Laid-open Patent Publication No. Hei-9-326755, which indicates that a clock signal is used for control. According to the invention, an light receiving apparatus is configured of an optical amplifier, a variable dispersion equivalent circuit and a clock detection circuit in the above order, so as to equalize wavelength dispersion according to a clock signal level.

Also, another invention is described in the second patent document of the Japanese Laid-open Patent Publication No. Hei-11-88261, which indicates that a compensation amount of a variable dispersion compensator is controlled so that a clock frequency component becomes maximum or minimum.

However, in any of the above first and second patent documents, there has been no technical disclosure in regard to the decision of the presence or absence of an optical signal.

SUMMARY

According to an aspect of the invention, a signal detection method in a light receiving apparatus includes: detecting an input light level of an optical amplifier; storing the input light level detected; comparing a preceding input light level stored in the memory with a present input light level to detect a change of the input light level; dispersion-compensating the input light; and extracting a clock signal from the input light, wherein, when the change in the level of the input light is detected in the comparison, the existence or non-existence of the optical signal in the input light can be distinguished by the presence or absence of the clock signal extracted by the extraction, and further, when any clock signal is not extracted in the extraction, a dispersion amount in the dispersion compensation is swept.

As another aspect of the invention, a light receiving apparatus includes an optical amplifier to which an input light is inputted; a light level detection circuit to detect a level of the input light inputted the optical amplifier; a memory to store the level of the input light detected by the light level detection circuit; a comparator to compare the level of a preceding input light level stored in the memory with a current level of the input light; and a clock extraction circuit connected to the output side of the dispersion compensation circuit, to extract a clock signal from the input light, wherein, when a change in the level of the input light is detected by the comparator, the existence or non-existence of an optical signal in the input light can be distinguished by the presence or absence of the clock signal extracted by the clock signal extraction circuit, and further, when any clock signal is not extracted by the clock signal extraction circuit, the dispersion compensation circuit is swept.

The object and advantage of the invention will be realized and attained by means of the elements and combinations particularly pointed our in the claims.

It is to be understood that both the foregoing general description and the following detailed description are exemplary and are not restrictive of the invention, as claimed.

DESCRIPTION OF EMBODIMENTS

As described previously, when a dispersion compensation amount by a dispersion compensator is not optimal, the clock extraction function in the light receiving apparatus does not work even when a signal light is being input.

This causes a problem of being impossible to decide to be either an optical signal or an ASE light.

Therefore, it is possible to discriminate the presence or absence of the optical signal by controlling the dispersion compensator at appropriate times, and by watching the state of clock extraction while searching an optimal dispersion value.

However, because some dispersion compensators have structures of mechanical polarization control of an optical component angle, the lifetime of the light receiving apparatus is shortened when operated continuously, or a problem of being unable to satisfy the specification required for the transmission system may also be produced.

Preferred embodiments are described herein after according to the drawings.

Figure 1:
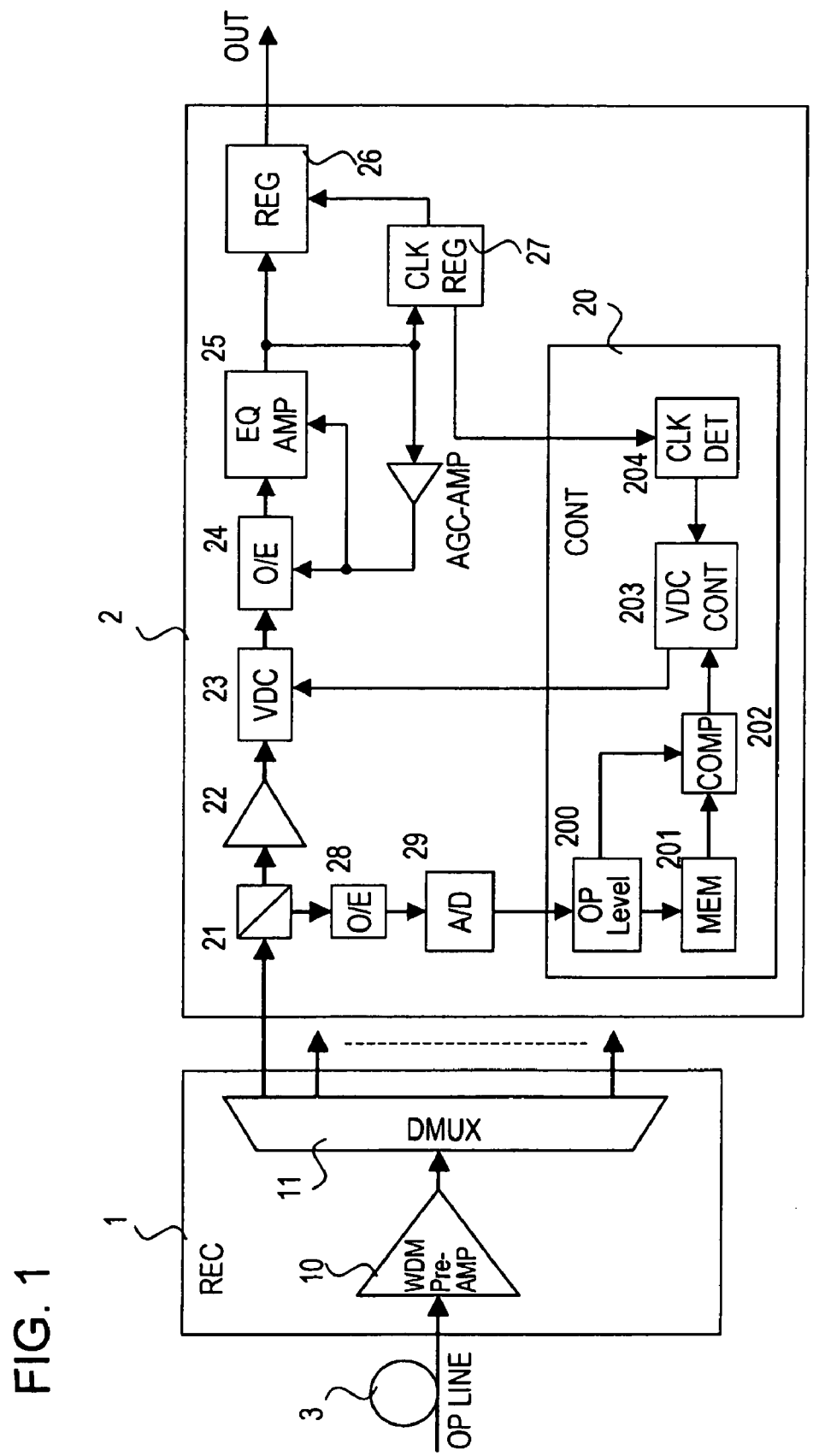
FIG. 1 is a block diagram illustrating an exemplary configuration of a receiving unit in optical transmission equipment to which the method of the present invention is applied.

FIG. 1 is a block diagram illustrating an exemplary configuration of a light receiving apparatus in optical transmission equipment to which the method of the embodiment is applied.

The light receiving apparatus includes a receiving section 1 and identification and reproduction sections 2, and each of the identification and reproduction sections 2 corresponds to one wavelength-multiplexed wavelength. Because of an entirely identical configuration, one identification and reproduction section 2 is depicted in FIG. 1.

A wavelength-division-multiplexed optical signal transmitted through an optical transmission line 3 is received in receiving section 1, so as to be amplified in a WDM preamplifier 10. WDM preamplifier 10 is an optical amplifier, which is formed of an Erbium-doped fiber, for example, as described before.

The wavelength-division-multiplexed optical signal amplified in WDM preamplifier 10 is input to a demultiplexer 11.

In the above demultiplexer 11, the wavelength-division-multiplexed optical signal is demultiplexed on a wavelength-by-wavelength basis. The demultiplexed optical signal of one wavelength is input to a branch unit 21 of the corresponding identification and reproduction section 2. Here, the optical input signal is input to an optical amplifier 22. With this, the operation of the optical amplifier is started. Here, optical amplifier 22 is also an optical fiber amplifier formed of an Erbium-doped fiber.

At the same time, branch unit 21 splits a portion of the input optical signal, which is then input to an opto-electric converter 28.

The optical signal amplified in optical amplifier 22 is converted into an electric signal by means of an opto-electric converter 24, after a dispersion amount is compensated in a dispersion compensator 23.

The converted electric signal is waveform-shaped through an equivalent amplifier circuit 25, and input to an identification and reproduction circuit 26.

The output of the equivalent amplifier circuit 25 is made to branch, and supplied to opto-electric converter circuit 24 and the equivalent amplifier circuit 25 through an AGC (Automatic Gain Control) amplifier AGC-AMP as an AGC control voltage, and thereby negative feedback control is performed.

Further, the output of the equivalent amplifier circuit 25 is input to a clock (CLK) extraction circuit 27. In synchronization with the clock extracted by the above clock extraction circuit 27, in identification and reproduction circuit 26, the level of the electric signal corresponding to the optical signal is reproduced and output.

Further, the clock state detected in clock extraction circuit 27 is input to a clock detection circuit 204 of a control unit 20.

By means of the above clock detection circuit 204, the presence or absence of the clock is determined. Namely, if there is no clock input from clock extraction circuit 27, clock extraction is not performed, and accordingly, it is determined to be a state of an optical signal break.

At this time, clock detection circuit 204 sweeps dispersion compensator 23 by controlling a variable dispersion compensator control circuit 203.

Now, a portion of the input light split by branch unit 21 is input to opto-electric converter 28, in which conversion into an electric signal is made. The electric signal is converted into a digital signal by means of an A/D converter 29.

The output of A/D converter 29 corresponds to the input light level, which is detected in a light level detection circuit 200 of the control unit 20. The detected input light level is retained in a memory 201.

Here, when there is a change to the state of an optical signal being existent in the input light, or when an optical signal does not exist any more from the state of the optical signal being existent in the input light, the above change is detected in a comparator 202 from a difference between the prior input light level retained in memory 201 and the current input light level detected in light level detection circuit 200.

Next, in the above-mentioned light receiving apparatus, the receiving operation corresponding to each state of the input light will be explained, by reference to the operation flow shown in FIG. 2.

[A Case of Changing from Only an ASE Light Input to an Input Including a Signal Light]

First, a case that only the ASE light is input without the existence of the optical signal is considered. The example shown in FIG. 3 is a diagram illustrating a light spectrum when the optical signal does not exist in the corresponding channel of the receiving unit shown in FIG. 1, namely, when only the ASE light is being input.

Figure 3:
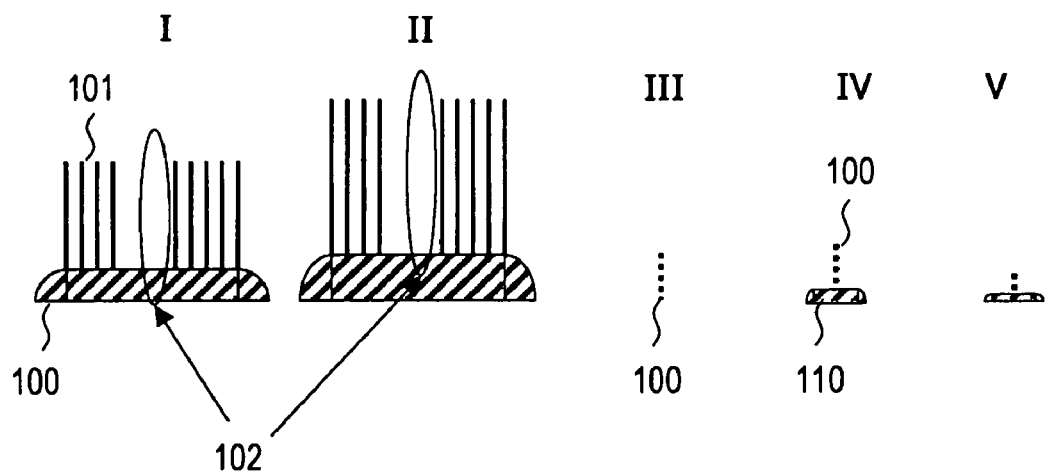
FIG. 3 is a diagram illustrating an optical spectrum when only an ASE light is being input.

In FIG. 3, I depicts an input of WDM preamplifier 10 in receiving section 1. The ASE light is spread over the entire wavelength bands, and no signal light exists in the wavelength of a channel 102 of interest. In other channels, a signal light 101 exist, which are superposed with an ASE light 100.

In FIG. 3, II depicts an optical signal spectrum amplified by WDM preamplifier 10.

III depicts an output being wavelength-demultiplexed by demultiplexer 11, which is in a state that no optical signal component exists in channel 102 of interest. Namely, a component being input to branch unit 21 shown in FIG. 1 is only ASE light 100.

(1) Accordingly, optical amplifier 22 detects the input of ASE light 100, and starts optical amplification operation (step S1).

(2) The output of optical amplifier 22 is as shown by IV, illustrating a state that ASE light 100 transmitted from transmission line 3 is superposed with ASE light 110 which is generated by optical amplifier 22.

(3) The output of optical amplifier 22 passes through variable dispersion compensator 23, and is converted into an electric signal by opto-electric converter 24. Further, the above converted signal is input to clock extraction circuit 27 through the equivalent amplifier circuit 25.

Here, because there is no existent optical signal, clock cannot be extracted by clock extraction circuit 27 (No in step S2).

Because of impossibility of clock extraction, clock detection circuit 204 in control unit 20 determines that clock does not exist. Accordingly, clock detection circuit 204 performs sweep control of a dispersion amount in the range of maximum/minimum dispersion compensation amounts being set at the time of the implementation of the optical transmission system (steps S3).

(5) In the above sweep process, clock extraction circuit 27 continues the clock extraction operation.

(6) Because of the state that the optical signal does not exist, clock is not extracted in clock extraction circuit 27 (No in step S4), and variable dispersion compensator 23 completes the sweep operation in the predetermined range.

(7) Next, the light input level is monitored, and a change of the light input is waited (steps S5-S7). Namely, comparator 202 in control unit 20 compares the state preserved in memory 201 with the level detection output by light level detection circuit 200, and the waiting state is continued until the change occurs.

[A Case that an Input Including a Signal Light Exists]

Figure 4:
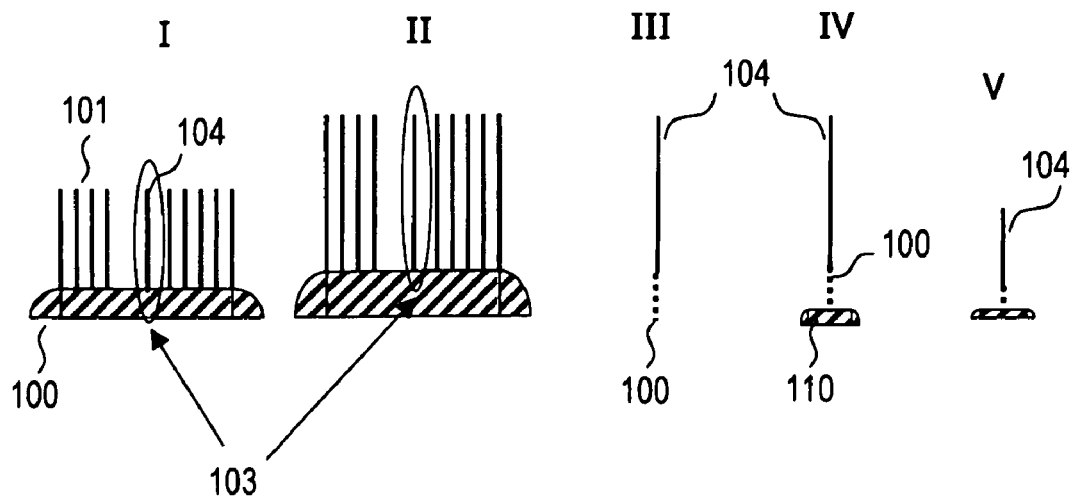
FIG. 4 is a diagram illustrating a case that an optical signal exists on a corresponding channel in the receiving unit shown in FIG. 1.

FIG. 4 is a diagram illustrating a case that an optical signal exists in a corresponding channel of the light receiving apparatus indicated in FIG. 1. In the comparison with FIG. 3, in I of FIG. 4, signal light 104 relative to the wavelength of channel 103 of interest is existent.

Figure 2:
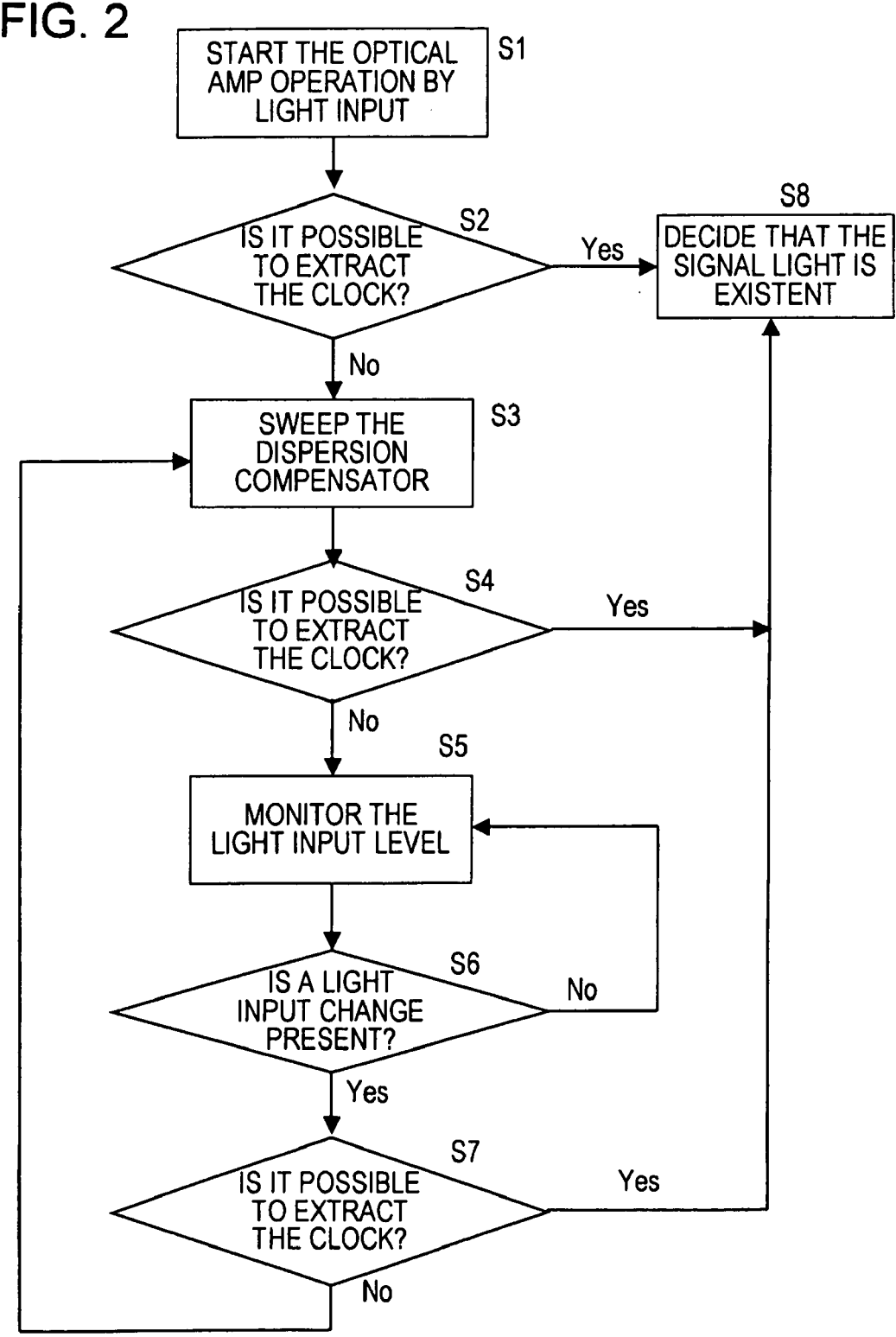
FIG. 2 is an operation flow of the operation of the receiving unit.

In the flow shown in FIG. 2, the processing of step S1-S3 is performed similar to the case of FIG. 3. In the above case, it is possible to detect a clock in the process of sweeping dispersion compensator 23 (Yes in step S4).

Accordingly, it is decided that a signal light exists (step S8).

[A Case of Changing from Only an ASE Light Input to an Input Including Signal Light]

Figure 5A:
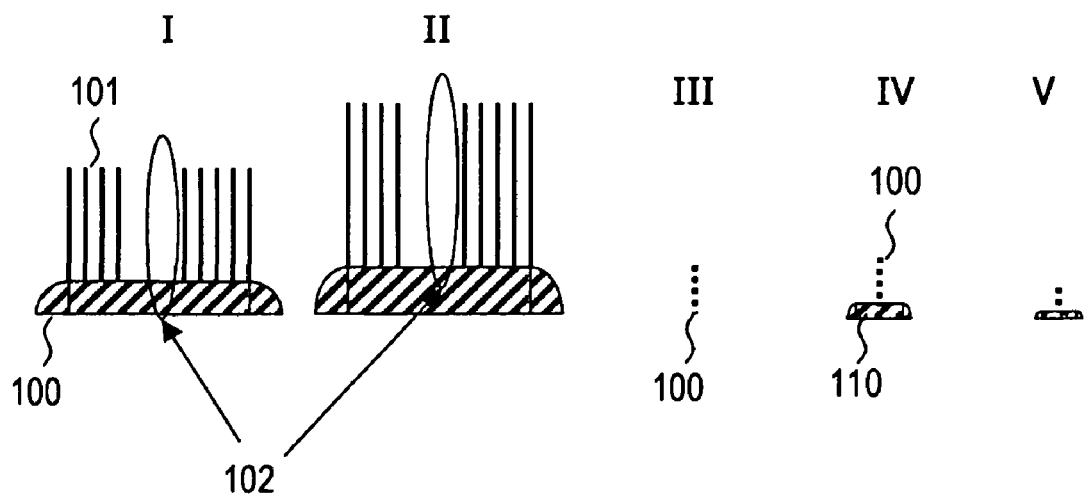
FIG. 5A is a diagram illustrating a state of changing from only an ASE light to a signal light, and a diagram illustrating the state of only the ASE light.
Figure 5B:
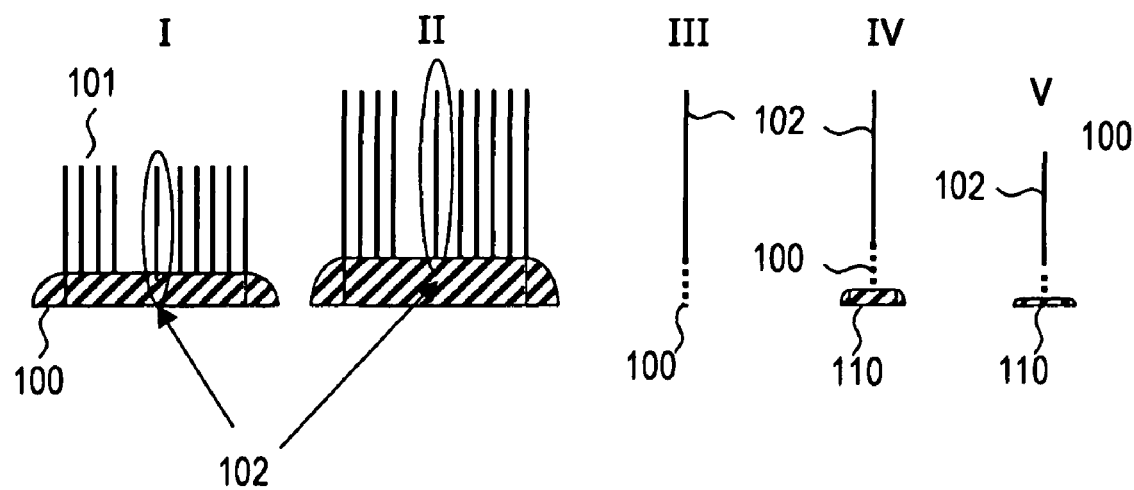
FIG. 5B is a diagram illustrating a state of changing from only an ASE light to a signal light, and a diagram illustrating a state that a change to the signal light is completed.

FIGS. 5A, 5B are diagrams illustrating a case of changing from only an ASE light to a signal light.

FIG. 5A is a diagram illustrating a state of only the ASE light, which is therefore similar to the state depicted in FIG. 3.

In FIG. 3 (FIG. 5A), in the process of the waiting state, when a change to the signal light is made, variation is detected in comparator 202 by comparing the level detection output from light level detection circuit 200 with the state of only the ASE light stored beforehand in memory 201, (step S6).

In the above state, when clock detection circuit 204 detects a clock, the decision that a signal light exists is made (Yes in step S7, and step S8).

On the other hand, when the clock cannot be detected by clock detection circuit 204 (No in step S7) by driving variable dispersion compensator control circuit 203 by the output of comparator 202, sweep is made while varying dispersion compensation amount of variable dispersion compensator 23 (step S3). By the above sweep operation, the clock is extracted by clock extraction circuit 27 (Yes in step S4), and therefore, it is decided the signal light is existent (step S8).

[A Case of Changing from a State of a Signal Light being Existent to Only an ASE Light]

Figure 6A:
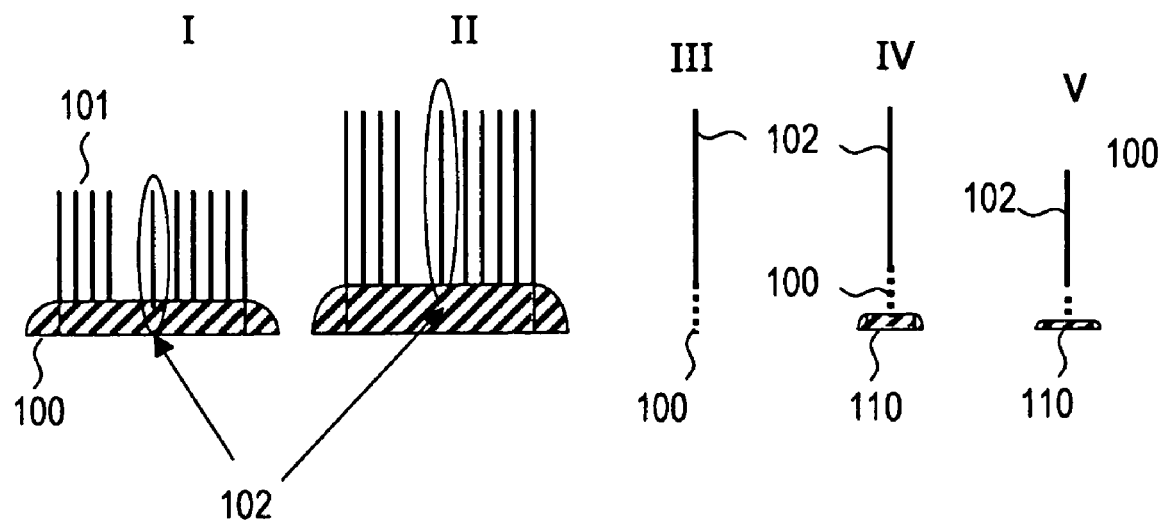
FIG. 6A is a diagram illustrating a state of changing from a signal light to only an ASE light, and a diagram illustrating a state that the change to a state of the signal light being existent is completed.
Figure 6B:
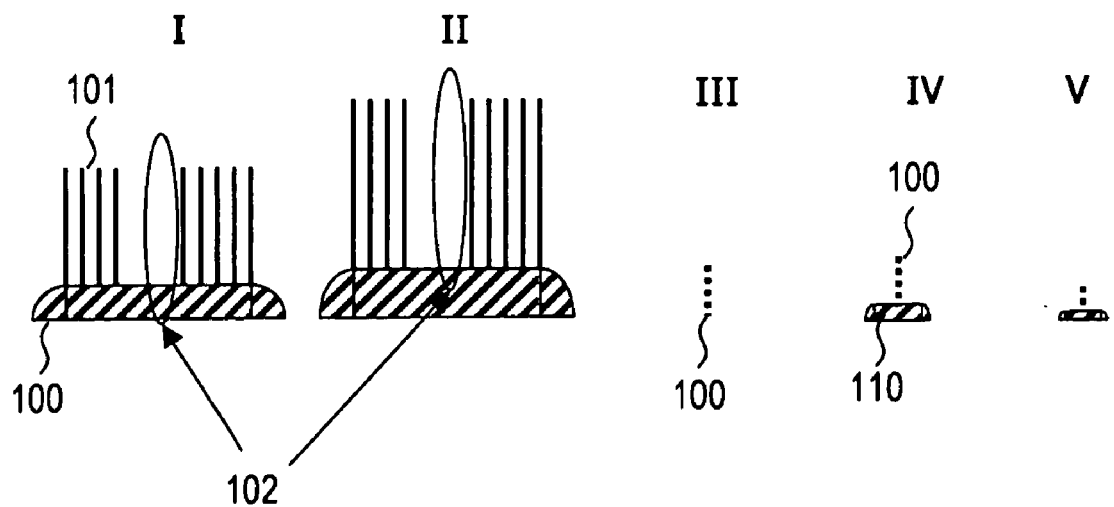
FIG. 6B is a diagram illustrating a state of changing from a signal light to only an ASE light, and a diagram illustrating a state that the change to only an ASE light is completed.

FIGS. 6A, 6B are diagrams illustrating a case of changing from a state of a signal light being existent to only an ASE light.

FIG. 6A is a diagram illustrating a state that the signal light exists, which is therefore similar to the state shown in FIG. 4.

In FIG. 6A, when there is a change from the state that signal light 102 is being detected to the state that the signal light does not exist as shown in FIG. 6B, it becomes impossible to extract the clock by clock extraction circuit 27 (No in step S2).

Accordingly, because the clock extraction cannot be made, clock detection circuit 204 in control unit 20 decides that the clock does not exist. Clock detection circuit 204 performs sweep control of the dispersion amount in the range between the maximum and the minimum dispersion compensation amounts which were set at the time of the implementation of the optical transmission system (step S3).

In the above sweep process, clock extraction circuit 27 continues the clock extraction operation. Because of the state that the optical signal does not exist any more, clock extraction circuit 27 does not extract the clock (No in step S4), and variable dispersion compensator 23 completes the sweep operation of the predetermined range.

At this time, when the decision that the optical signal does not exist in the above-mentioned input light is made, it may also be possible to suspend pumping to the above-mentioned optical amplifier 22.

As the embodiment has been described, according to the present invention, it is possible to accurately decide the state of the presence or absence of the optical signal or the state that the presence or absence of the optical signal is changed. By this, it is possible to report the state of the presence or absence of the optical signal to optical transmission equipment in the succeeding stage, as line state information.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A signal detection method in a light receiving apparatus comprising:
   detecting a level of an input light input to an optical amplifier;
   storing the level of the input light detected in a memory;
   comparing the level of a preceding input light stored in the memory with a current level of the input light;
   detecting a state of existence or non-existence of an optical signal according to a change, of the input light level, detected in the comparison;
   dispersion-compensating the input light; and
   extracting a clock signal from the input light,
   wherein, when the change in the level of the input light is detected in the comparison, the existence or non-existence of the optical signal in the input light can be distinguished by the presence or absence of the clock signal extracted by the extraction, and further, when any clock signal is not extracted in the extraction, a dispersion amount in the dispersion compensation is swept.

2. A light receiving apparatus comprising:

an optical amplifier, to which an input light is inputted;

a light level detection circuit configured to detect a level of the input light inputted to the optical amplifier;

a memory configured to store the level of the input light detected by the light level detection circuit;

a comparator configured to compare the level of a preceding input light stored in the memory with a current level of the input light;

a dispersion compensation circuit to dispersion-compensate the input light; and a clock extraction circuit connected to the output side of the dispersion compensation circuit, configured to extract a clock signal from the input light, wherein, when a change in the level of the input light is detected by the comparator, the existence or non-existence of an optical signal in the input light can be distinguished by the presence or absence of the clock signal extracted by the clock signal extraction circuit, and further, when any clock signal is not extracted by the clock signal extraction circuit, the dispersion compensation circuit is swept.

3. The light receiving apparatus according to claim 2, wherein the optical amplifier is an optical fiber amplifier, and when it is decided in the comparison by the comparator that the optical signal is non-existent in the input light, pumping the optical amplifier is suspended.

* * * * *